United States Patent
Paterra

(10) Patent No.: US 11,188,564 B1
(45) Date of Patent: Nov. 30, 2021

(54) SHIPPABLE STORAGE DEVICES FOR BULK DATA TRANSFER, STORAGE, AND REMOTE SYNCHRONIZATION

(71) Applicant: Amazon Technologies, Inc., Seattle, WA (US)

(72) Inventor: Frank Charles Paterra, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 342 days.

(21) Appl. No.: 15/194,067

(22) Filed: Jun. 27, 2016

(51) Int. Cl.
  G06F 7/00 (2006.01)
  H04J 3/06 (2006.01)
  G06F 16/27 (2019.01)
  H04L 29/08 (2006.01)
  H04L 9/06 (2006.01)
  G06Q 10/08 (2012.01)
  H04W 4/80 (2018.01)

(52) U.S. Cl.
  CPC ....... *G06F 16/275* (2019.01); *G06Q 10/0832* (2013.01); *H04L 9/06* (2013.01); *H04L 67/104* (2013.01); *H04L 67/1097* (2013.01); *H04W 4/80* (2018.02)

(58) Field of Classification Search
  USPC ......................................................... 707/620
  See application file for complete search history.

(56) References Cited

U.S. PATENT DOCUMENTS

| | | | |
|---|---|---|---|
| 7,681,104 B1* | 3/2010 | Sim-Tang | H04L 1/0057 714/763 |
| 9,098,447 B1* | 8/2015 | Donlan | H03M 13/1102 |
| 9,141,679 B2 | 9/2015 | Gopalan et al. | |
| 9,158,927 B1* | 10/2015 | Franklin | G06F 21/602 |
| 9,565,250 B2* | 2/2017 | Calder | H04L 67/1095 |
| 2012/0166576 A1* | 6/2012 | Orsini | G06F 11/1471 709/217 |
| 2013/0227047 A1* | 8/2013 | Dolce | G06F 3/0605 709/213 |
| 2014/0379648 A1* | 12/2014 | Chiu | G06F 16/113 707/624 |
| 2014/0380126 A1* | 12/2014 | Yekhanin | G06F 11/1076 714/766 |
| 2016/0077933 A1* | 3/2016 | Ventura | G06F 11/201 714/4.1 |

(Continued)

*Primary Examiner* — Phuongchau Ba Nguyen
(74) *Attorney, Agent, or Firm* — Robert C. Kowert; Kowert, Hood, Munyon, Rankin & Goetzel, P.C.

(57) ABSTRACT

Multiple shippable storage devices may be used for a bulk data transfer, local storage, and remote synchronization to a remote storage service. A storage service provider ships multiple shippable storage devices to a client, which are then attached to the client network. The client data on the client network is transferred to the shippable storage devices according to a redundancy encoding scheme. A subset of the shippable storage devices are then shipped back to the remote storage provider to store a copy of the client data at the remote storage service. The remainder of the shippable storage devices are sufficient in number to store the client data. When the client data is updated on the shippable storage devices, the shippable storage devices send an update via network transmission to the remote storage service. The remote storage service then updates the copy of the client data.

20 Claims, 10 Drawing Sheets

(56) References Cited

U.S. PATENT DOCUMENTS

2016/0380776 A1* 12/2016 Thubert ................ H04L 9/3263
                                                        713/175
2017/0060683 A1*  3/2017 Luby ..................... G06F 3/067
2017/0177883 A1*  6/2017 Paterra ................. H04L 9/0822
2017/0180368 A1*  6/2017 Paterra ................ H04L 63/0435

* cited by examiner

US 11,188,564 B1

SHIPPABLE STORAGE DEVICES FOR BULK DATA TRANSFER, STORAGE, AND REMOTE SYNCHRONIZATION

BACKGROUND

Growth of data storage capacity for computer systems has far outpaced the growth in transmission speed for transferring data over networks between computer systems. The discrepancy is so great that transmitting a large amount of data from one storage facility to another storage facility can be prohibitively costly (e.g., requiring costly system upgrades) or lengthy (e.g., transmission taking several months or longer). Physically moving the storage media may leave the data on legacy hardware or may not be an available option (e.g., when the data is stored by a storage service on behalf of the customer). Some solutions have involved transferring the data to a portable storage device (e.g., network attached storage devices) and shipping the portable storage device to another storage facility where the data is transferred to another storage system.

Further, different customers may use different types of storage devices to transfer data to a storage service provider. New storage devices and techniques are constantly being developed and adopted by customers. Therefore, as the amount of data transferred from customers grows, it may become increasingly difficult for a storage service provider to transfer the data from multiple disparate storage devices in a secure and efficient manner. Moreover, client data stored by a storage service provider may become stale and out of synch with client data that has been updated at a client site.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement shippable storage devices for a bulk data transfer, local storage, and remote synchronization to a remote storage service. A storage service provider may ship multiple shippable storage devices to a client, which are then attached to the client network. The client data on the client network may be transferred to the shippable storage devices according to a redundancy encoding scheme. A portion of the shippable storage devices may then be shipped back to the remote storage provider to store a copy of the client data at the remote storage service. When the client data is updated on the shippable storage devices of the client network, the update may also be sent, via network transmission, to the remote storage service in order to update the copy of the client data at the remote storage service (e.g., synchronize the copy of the client data with the client data at the client network).

Thus, a large amount of data may be transferred in bulk from a client location to a remote storage service in a much shorter amount of time by using shippable storage devices instead of by using network transmission. However, subsequent updates to the client data may be sent to the remote storage service in a much shorter amount of time via network transmission instead of sending updates by physically transferring devices, because an update to client data typically requires much less bandwidth than a bulk transfer of client data. Note that in the descriptions that follow, the terms "remote storage provider" and "remote storage service" may refer to the functionality provided by a storage service, to the underlying computing system that is configured to implement that functionality, and/or to a location (e.g., a location that a device may be shipped to or shipped from).

Figure 1:
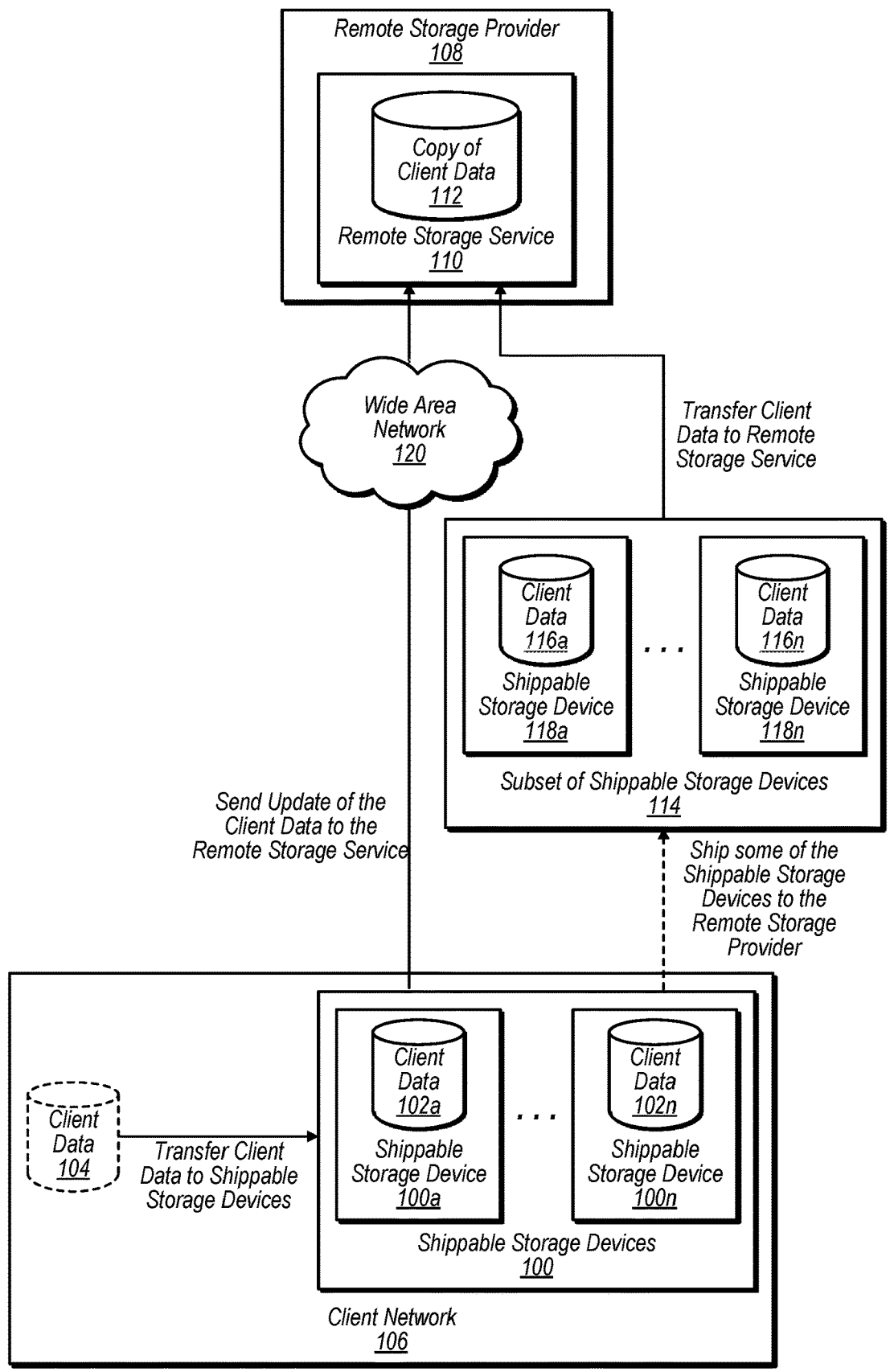
FIG. 1 illustrates a system for bulk data transfer, storage, and remote synchronization using shippable storage devices, according to some embodiments.

FIG. 1 illustrates a system for bulk data transfer, storage, and remote synchronization using shippable storage devices 100, according to some embodiments. The shippable storage devices 100 depicted in FIG. 1 may be the same type of shippable storage device, and include some or all of the same components as other shippable storage devices depicted in FIGS. 1-7, in embodiments.

In the depicted embodiment, each shippable storage device 100a-100n includes a corresponding portion of client data 102a-102n. The client data 104 stored on the client network 106 may be transferred to the shippable storage devices 100. Thus, after the transfer, the client may use the shippable storage devices 100 to maintain the client data 102 instead of using legacy client storage devices of the client network 106.

In embodiments, to transfer the client data 104, the shippable storage devices 100 and/or devices of the client network 100 distribute the client data 104 to each of the shippable storage devices 100 in accordance with a redundancy encoding scheme (such as a parity, error correction code, or other redundancy encoding scheme). For example, the client data 104 may be encoded into n shards in accordance with a data redundancy scheme, and a different shard may be transferred to each shippable storage device 100a-100n and stored as client data 102a-102n. Thus, if one or more shards are lost due to failure of one or more devices, the one or more shards may be recreated (reconstructed) from at least some of the remaining shards from the devices that did not fail.

As a non-limiting example, a redundancy encoding scheme may be an "erasure encoding scheme," in which additional data (e.g., redundant data) is added to a data object to create an expanded data object. The expanded data object may be divided into n shards. However, in this example, only k shards are necessary to recreate the data object. As just one specific example, an erasure encoding scheme may be used in which 20 shards are generated for a data object (n=20), and 11 shards are required to recreate the data object (k=11). As another example, an erasure encoding scheme may be used in which 40 shards may be generated for a data object (n=40), with 10 shards required to recreate the data object (k=10). Note that, even if shards are lost from a storage system that implements the redundant encoding scheme, if at least k shards remain, generally no data is lost, as the remaining shards should include sufficient information to recreate the data object (e.g., the original data object).

In some embodiments, instead of using redundancy encoding, the client data is partitioned into n partitions, which are stored as client data 102a-102n. In other embodiments, a replica of the client data 104 is stored on each of the shippable storage devices 100 as client data 102a-102n. Therefore, even though techniques described herein may use redundancy encoding, it is contemplated that any of these other methods for storing client data on the shippable storage devices 100 may instead be used.

In embodiments, a remote storage provider 108 provides the shippable storage devices 100 to the client for us in the client network 106 (e.g., via shipping to the client). The remote storage provider 108 may also provide a remote storage service 110 to store a copy of the client data 112 (e.g., using one or more storage devices of the storage service provider 108). Thus, in embodiments, the copy of client data 112 may be a copy of the client data 102 stored on the shippable storage devices 100 of the client network.

In order provide the copy of client data 112 to the storage service provider, the client may ship a subset of shippable storage devices 100 to the remote storage provider 108 to ingest client data 116a-116n stored on shippable storage devices 118a-118n, and subsequently store as copy of client data 112. For example, each of the client data 116a-116n may be a shard. Thus, the remote storage service 110 may reconstruct the shards 116a-116n in accordance with a redundancy encoding scheme to generate the copy of client data 112. In embodiments, the subset of shippable storage devices 114 includes at least a minimum number of the shippable storage devices 100 necessary to reconstruct the shards 116a-116n to generate the copy of client data 112. For example, if the shippable storage devices 100 includes 20 devices, and a minimum of 10 devices are necessary, then the shippable storage devices 114 must include at least 10 devices.

In some embodiments, after a client updates the client data 102 (e.g., via a write, modify, delete, or other suitable commands to update data), the shippable storage devices 100 send the update to the remote storage service 110 via a wide area network 120 (e.g., internet and/or other networks), so that the copy of client data 112 matches the updated client data 102 of the client network 106 (e.g., synchronizing the copy of client data 112 with the client data 102.

Figure 2A:
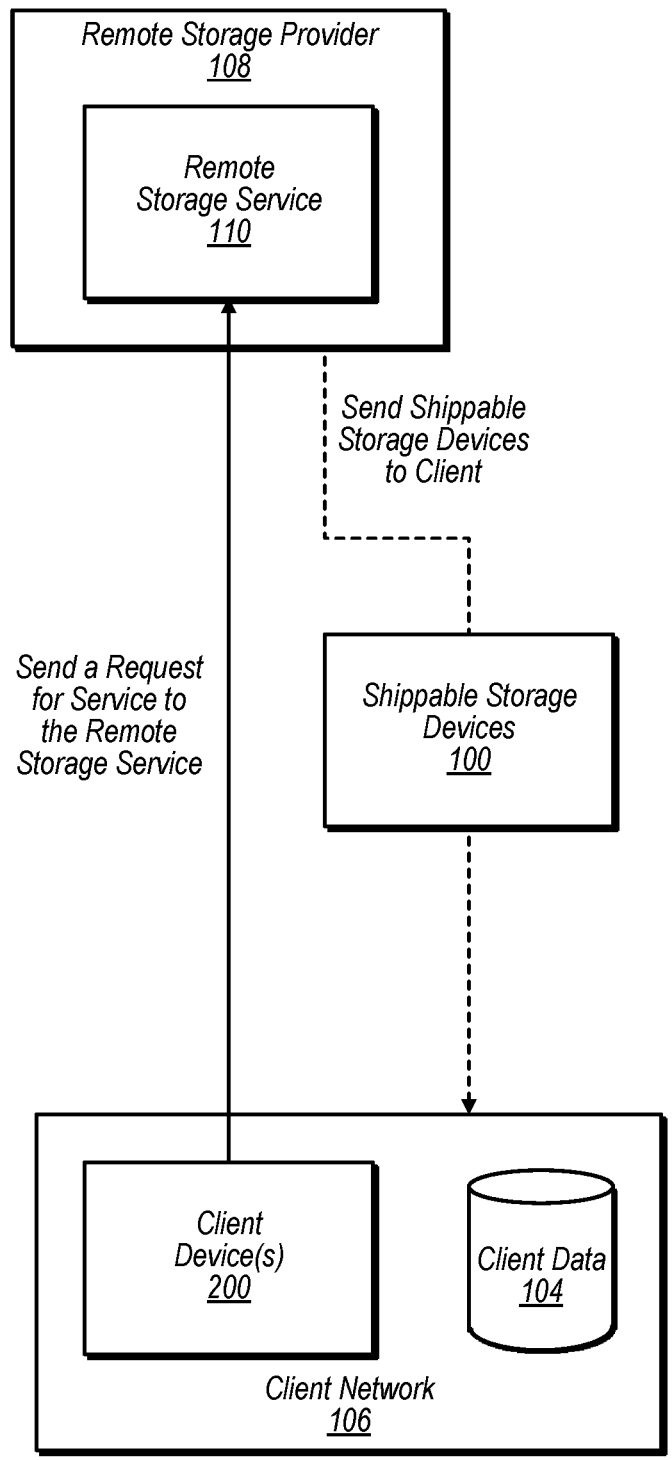
FIG. 2A is a flow diagram of a process for a client network receiving shippable storage devices from a remote storage provider, according to some embodiments.

FIG. 2A is a flow diagram of a process for a client network 106 receiving shippable storage devices 100 from a remote storage provider 108, according to some embodiments. In embodiments, one or more client devices 200 may send a request for service to the remote storage service 110. The request may indicate a request for one or more shippable storage devices to be used for bulk data transfer from the client network 106 to the remote storage service 110, for local storage at the client network 106, and for synchronization between client data 102 stored at the client network 106 and a copy of client data 112 at the remote storage service 112.

In response, the remote storage provider 108 may determine that one or more shippable storage devices 100 are required, provision them, and send them to the client for installation on the client network 106. To provision the one or more shippable storage devices 100, the remote storage service 110 may store software code (e.g., executable instructions) onto one or more of the devices (e.g., onto a persistent storage) that is executable to perform one or more of the various functions discussed above and below for the one or more shippable storage devices 100. In embodiments, the request may include one or more parameters, such as an indication of an amount of storage space used to store the client data 104, an amount of desired storage space of the shippable storage devices 100, and a desired level of data durability (e.g., ability to retain all of the client data 102 despite one or more device failures). The remote storage service 110 may determine a number of shippable storage devices 100 required based on one or more of the above parameters.

Figure 2B:
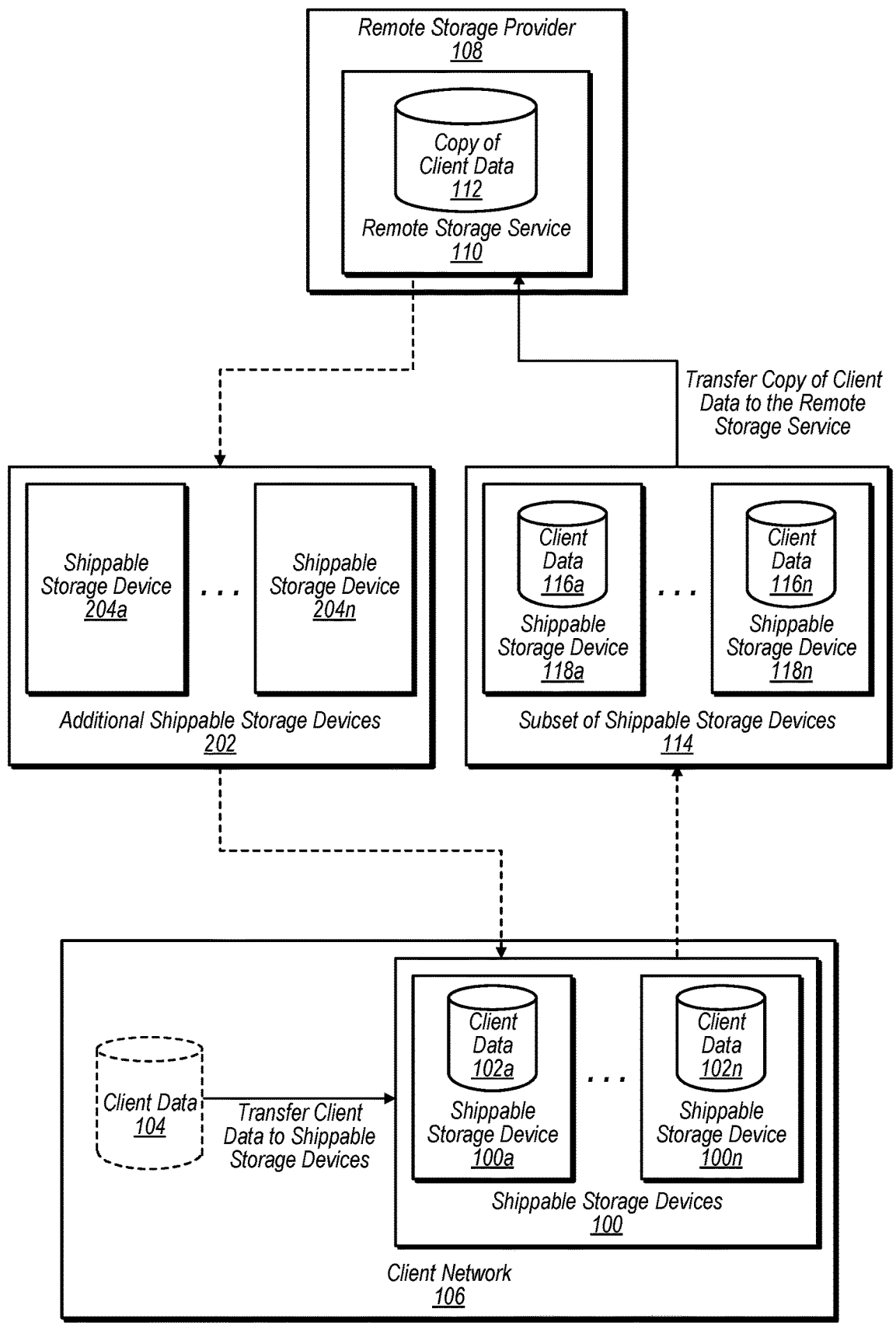
FIG. 2B is a flow diagram of a process for storing client data to a set of shippable storage devices of a client network and storing a copy of the client data at a remote storage service, according to some embodiments.

FIG. 2B is a flow diagram of a process for storing client data 102 to shippable storage devices 100 of a client network 106 and storing a copy of the client data 112 at a remote storage service 110, according to some embodiments. In the depicted embodiment, the client data 104 stored on the client network 106 may be transferred to the shippable storage devices 100. For example, the shippable storage devices 100 may distribute the client data 104 to each of the shippable storage devices 100 in accordance with a redundancy encoding scheme.

In some embodiments, a particular device, such as shippable storage device 100a, is designated as the master shippable storage device, which obtains the client data 104 from one or more locations on the client network 106 and then distributes the client data 104 to the set of shippable storage devices 100 as client data 102a-102n (e.g., in accordance with a redundancy encoding scheme). In some instances, the master device distributes the client data 104 to at least two of the set of shippable storage devices 100 in accordance with a data redundancy scheme.

In some instances, after the one or more of the shippable storage devices 100 obtains the client data 104, the one or more of the shippable storage devices 100 encodes the client data 104 into a plurality of shards of client data in accordance with a redundancy encoding scheme. Then, the one or more of the shippable storage devices 100 encrypts each of the plurality of shards using at least one encryption key to create the encrypted shards of client data 102a-102n. The one or more of the shippable storage devices 100 may then distribute each of the encrypted shards of client data 102a-102n to a different corresponding one of the shippable storage devices 100a-100n.

In embodiments, the at least one encryption key is not persisted on any of the plurality of shippable storage devices (e.g., not stored in persistent storage). The at least one encryption key may also be deleted from memory after encryption is complete. In some instances, the at least one encryption key is provided and stored by the client network 106 or by the remote storage service 110. Thus, the client data 116 may be protected when the subset of shippable storage devices 114 is shipped from the client to the remote storage provider 108.

In various embodiments, the client, the remote storage service 110, or one or more of the shippable storage devices 100 may designate the shippable storage device 100a as master. In embodiments, the master device and/or one or more other devices executes a data transfer tool (e.g., via code/instructions) to obtain and distribute the client data 104 across the shippable storage devices 100. In other embodiments, the client may execute a data transfer tool using a client device of the client network or the data transfer tool may execute remotely, such as at the remote storage service 110.

Any of the various discussed functions of the one or more shippable storage devices 100 may be provisioned as executable instructions by the remote storage service 110 before shipment to the client. For example, the remote storage provider 108 may provision the one or more shippable storage devices 100 with instructions for storing data across the plurality of remote shippable storage devices 100 in accordance with a redundancy encoding scheme.

In an embodiment, the data transfer tool or the client selects one or more of the shippable storage devices 100 to form the subset of shippable storage devices 114 for sending to the remote storage provider 108. At the remote storage provider 108, the client data 116 may be ingested and stored as the copy of client data 112. For example, the client data 116 may be reconstructed from the shippable storage devices 118 in accordance with a data redundancy scheme. In some embodiments, a data transfer tool transfers a copy of the client data 104 or client data 102 to one or more extra shippable storage devices (e.g., extra devices provided by the remote storage provider 108) in addition to the cluster of shippable storage devices 100, and the one or more extra shippable storage devices are sent to the remote storage provider 108 for ingestion. In some cases, the data on the one or more extra shippable storage devices may be a whole copy (e.g., without being sharded and encoded). Thus, no reconstruction may be necessary for the remote storage provider 108 to ingest the data. In some cases, after ingestion, the remote storage provider 108 indicates to the client network 106 and/or the shippable storage devices 100 that data ingestion is complete (e.g., via the wide area network 120).

The remote storage provider 108 may also send one or more additional shippable storage devices 202 to the client for adding to the cluster of shippable storage devices 100. For example, the client may desire a higher level of durability and/or redundancy for the client data 102 than currently exists. Thus, the client may request a number of additional shippable storage devices 202 required to meet the higher level of durability. In some instances, one or more of the additional shippable storage devices 202 are selected from the subset of shippable storage devices 114. Thus, one or more of the subset of shippable storage devices 114 may be re-used by the client after the remote storage service 110 ingests the data 116a-116n. Moreover, in embodiments, one or more of the additional shippable storage devices 202 may be sent to the client any time before, during (concurrently), or after the subset of shippable storage devices 114 are shipped to the remote storage provider 108.

Figure 2C:
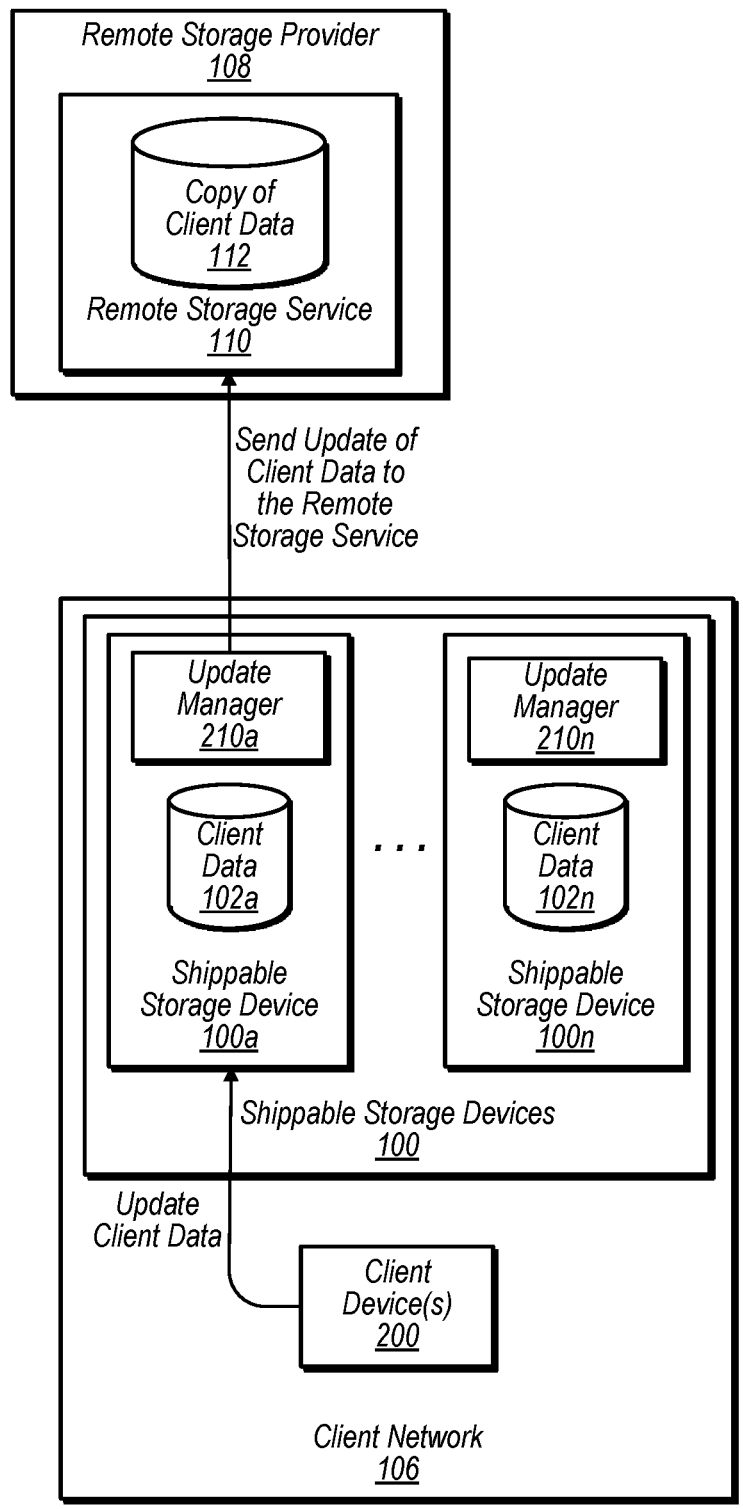
FIG. 2C is a flow diagram of a process for updating client data at a set of shippable storage devices of a client network and updating a copy of the client data at a remote storage service, according to some embodiments.

FIG. 2C is a flow diagram of a process for updating client data 102 on shippable storage devices 100 of a client network 106 and updating a copy of the client data 112 at a remote storage service 110, according to some embodiments. In the example embodiment, a client device 200 sends an update for the client data 102 to one or more of the shippable storage devices 100. The update may include any command or instruction suitable for providing information necessary for the shippable storage devices 100 to perform the update to the client data 102. For example, if the shippable storage device 100a is designated as the master device, then it may receive the update for the client data 102 and then perform the update to the client data 102. To perform the update, the master device may perform the update to the client data 102 across two or more of the shippable storage devices 100 in accordance with a redundancy encoding scheme.

In various embodiments, after the shippable storage devices 100 receive the update for the client data 102, one or more of the shippable storage devices 100 are selected according to a peer protocol and the selected device performs the update to the client data 102 by updating the client data 102 stored on the selected device and/or one or more of the other shippable storage devices 100. For example, the shippable storage device 100a may be selected according to a peer networking protocol. Any suitable distributed computing scheme and/or distributed application may be implemented for selecting one or more of the shippable storage devices 100 to perform the update or to perform any other functions of the one or more of the shippable storage devices 100 (e.g., peer-to-peer networking protocol, routing table, gossip protocol, polling, etc.). Thus, in embodiments, two or more of the shippable storage devices 100 may collectively determine which of the shippable storage devices 100 will have data modified in order to update the client data 102. In some instances, the remote storage service 110 may determine which of the shippable storage devices 100 will have data modified in order to update the client data 102 (e.g., based on health status, available storage space, etc.).

In some embodiments, one or more of the shippable storage devices 100 may provide to the client device 200 an interface for updating the client data 102 (e.g., storing new data, modifying data, or deleting data). The interface may be a graphical user interface and/or a programmatic interface (e.g., an application programming interface (API)). In an embodiment, the interface is a same interface as an interface that may be provided to the client device 200 by the remote storage service 110 for storing data to the remote storage service 110. In some cases, the interface provides to the client device 200 a subset of functions provided by an interface that may be provided to the client device 200 by the remote storage service. Thus, a user of the client device 200 may already be familiar with the interface provided by the one or more shippable storage devices 100, eliminating or reducing the need for training to use the new interface.

One or more of the shippable storage devices 100 may also send the update to the remote storage service 110 in order for the remote storage service 110 to update the copy of the client data 112 at the remote storage service 110. For example, the designated master device may send the update to the remote storage service 110. Further, in embodiments, an update manager 210 executing on the master device may receive the update, perform the update, and send the update, as described above. In embodiments, the update manager 210 may execute on one or more of the shippable storage devices 100 as a distributed application including multiple instances 210a-210n.

In some embodiments, the client may update the copy of client data 112 without sending the update to the shippable storage devices 100. For example, the client may use a client device 200 to update the copy of client data 112 by sending the update to the remote storage service 110 via the wide area network 120. The remote storage service 110 may then send the update to the shippable storage devices 100 via the wide area network 120 so that the copy of client data 112 and the client data 102 are synchronized.

Figure 2D:
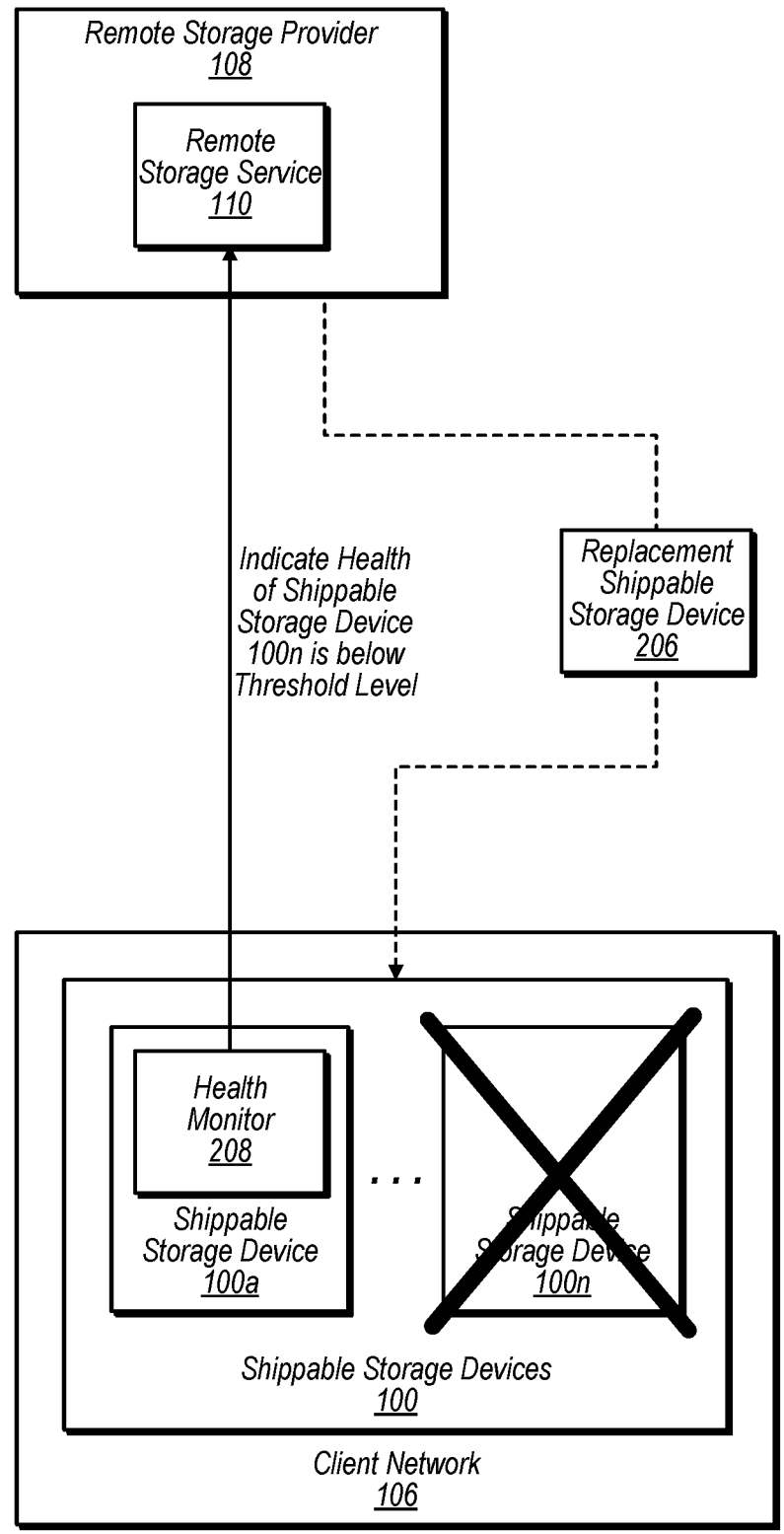
FIG. 2D is a flow diagram of a process for replacing a shippable storage device of a client network, according to some embodiments.

FIG. 2D is a flow diagram of a process for replacing a shippable storage device 100 of a client network, according to some embodiments. One or more of the shippable storage devices 100 (e.g., a master device) may send a request for a replacement shippable storage device 206 to the remote storage provider 108. In some cases, the one or more of the shippable storage devices 100 may instead send information regarding one of the shippable storage devices 100 (e.g., health status or available storage space), and as a result, the remote storage provider 108 may determine that a new or additional device is needed and may then send the replacement shippable storage device 206.

In some embodiments, the remote storage provider 108 (e.g., the remote storage service 110) may determine, based on the health status, that the device has failed and/or needs to be replaced with another device that meets a minimum health level (e.g., health threshold). In some cases, the remote storage provider 108 (e.g., the remote storage service 110) may determine, based on the amount of available or unused storage of one or more of the shippable storage devices 100 (e.g., below a threshold amount), that an additional device needs to be sent to shippable storage devices 100.

In some instances, one or more of the shippable storage devices 100 executes a health monitor 208, which may be a software application and/or hardware-based tool. In an embodiment, the shippable storage device 100a is designated as a master device and executes the health monitor 208. The health monitor 208 receives information that indicates a state of health for each of the shippable storage devices 100. In some instances, the health monitor 208 determines one of a plurality of health levels for each of the shippable storage devices 100, based on the received information. A higher health level may indicate more efficient and/or faster operation and/or fewer errors associated with operation of a device. Conversely, a lower health level may indicate less efficient and/or slower operation and/or more errors associated with operation of a device. In some instances, the health level may indicate that a device is failed or is not failed.

In embodiments, the health monitor 208 determines that a health level of shippable storage device 100n is below a pre-determined threshold value. In response, the health monitor 208 may send an indication that the health level is below the pre-determined threshold value and/or send a request for a replacement shippable storage device 206 to the remote storage service 110. In some embodiments, the health monitor 208 may send an indication that the health level of the shippable storage device 100n is below the pre-determined threshold value or has failed. In response to receiving one or more of the above indications and/or request, the remote storage provider 108 may send the replacement shippable storage device 206 to the client to replace the shippable storage device 100n.

In some instances, the health monitor 208 determines that an amount of available storage space of the shippable storage devices 100 is below a pre-determined threshold value. In response, the health monitor 208 may send an indication that the available storage space is below the pre-determined threshold value and/or send a request for a replacement shippable storage device 306 to the remote storage service 108. In some embodiments, the health monitor 208 may send an indication of the available storage space of the shippable storage device 100. In response to receiving one or more of the above indications and/or request, the remote storage provider 108 may send the replacement shippable storage device 206 to the client to replace the shippable storage device 100n.

Further, in some instances, a client device 200 may send a request to increase a durability of the client data 102 from a lower level of durability to a higher level of durability. In response to receiving the request, the remote storage provider 100 may provide one or more new shippable storage devices to the client, such that the number of new shippable storage devices is at least the minimum number required to achieve the higher level of durability. In embodiments, if the durability of the client data 102 is increased, then a larger number of the shippable storage devices 100 may fail, but the client data 102 may still be reconstructed from the remaining shippable storage devices 100 that did not fail.

In embodiments, after a new or replacement shippable storage device 206 is attached to the client network 106, one or more of the shippable storage devices 100 may detect its presence. For example, a master device, may detect the new device and authenticate the new device before joining the new device to the cluster of shippable storage devices 100. The master device may then cause at least a portion of the client data 102 to be stored onto the new shippable storage device in accordance with a redundancy encoding scheme.

Figure 3:
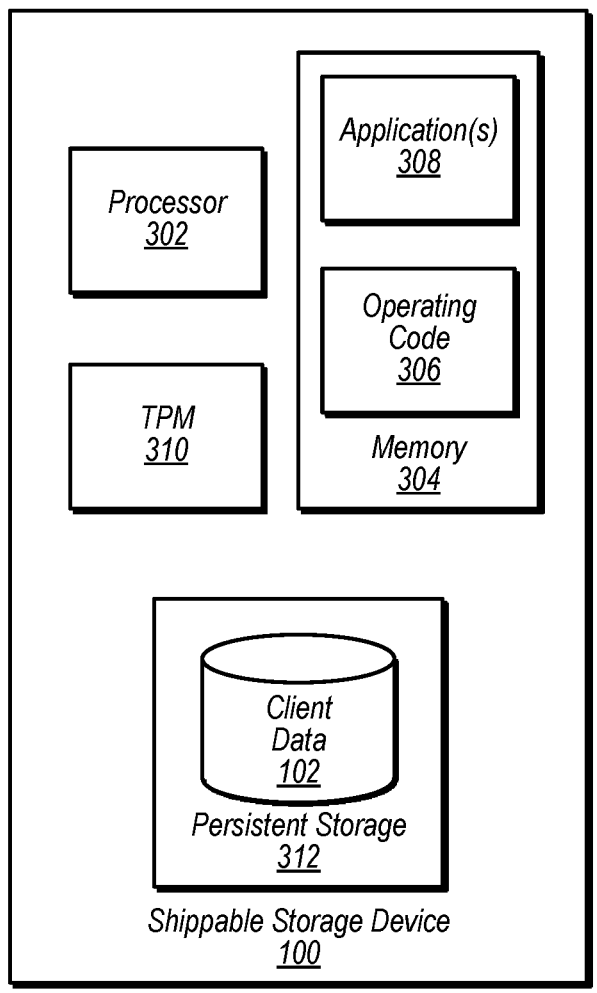
FIG. 3 illustrates a logical block diagram of a shippable storage device, according to some embodiments.

FIG. 3 illustrates a logical block diagram of a shippable storage device 100, according to some embodiments. The device may be configured with fewer or additional components or modules. Some components or modules may be replaced by other components or modules. For example, the processor 302 and memory 304 may be replaced by firmware, in embodiments. Various components or modules may perform some or all of the processes illustrated in FIGS. 5-6, in embodiments.

The processor 302 may execute the operating code 306 and the one or more applications 308 in the memory 304. In embodiments, the operating code 306 comprises code for implementing an operating system or any functions associated with an operating system (e.g., one or more hypervisors, one or more virtual machines, etc.). The applications 308 comprise one or more applications that include code that can be executed by the processor 302 and/or the operating code 306 (e.g., health monitor 208, update manager 210, and/or a data transfer tool).

In embodiments, the operating code 306 and/or the applications 308 may be provisioned by the remote storage service 110 before shipment to the client. In some instances, the operating code 306 and/or the applications 308 may be downloaded and/or transferred from the client network 106, the remote storage service 110, or any other suitable source.

In some instances, after attaching the shippable storage device 100 to the client network 106, the shippable storage device 100 may receive a request to authenticate the shippable storage device 100. In some embodiments, the request may be received from the client network 106 or the remote storage service 110. In response to the request to authenticate, the shippable storage device 100 may then provide authentication information based on security information pre-provisioned within the shippable storage device 100 (e.g., pre-provisioned in a secure area by the remote storage service 110, such as a secure area of a trusted platform module (TPM) 310). In embodiments, a shippable storage device 100 designated as the master device may perform the authentication process. The master device may detect a new shippable storage device 100 attached to the client network 106 and prior to joining the new shippable storage device 100 to the cluster shippable storage devices 100, authenticate the new shippable storage device.

In an embodiment, a request to authenticate may include a value (e.g., a clear text string, number, code, or series of characters and/or numbers). The shippable storage device 100 may generate the authentication information by processing the value with the pre-provisioned information. For example, the TPM 310 may include an encryption key, digital certificate, or other pre-provisioned security information that is used to encrypt the received value to generate the authentication information (e.g., the encrypted clear text string). The remote storage provider 110 (or the client network 106, via authentication software) may then compare the encrypted clear text string received from the shippable storage device 100 to a stored value of the remote storage service 110 or the client network 106 (also an encrypted clear text string). If the encrypted clear text string matches the stored value, then the remote storage service 110 or the client network 106 may determine that the shippable storage device 100 is authentic (e.g., validate the identity of the device, verify that the device has not been tampered with, and/or validate the operating code 306 and the applications 308). If not, the remote storage service 110 or the client network 106 may determine that the shippable storage device 100 is not authentic and may prevent the shippable storage device 100 from executing the operating code 306 and/or applications 308.

In embodiments, the shippable storage device 100 may include additional components. For example, the shippable storage device 100 may include a display driver that communicates with a display for showing a shipping address. To instruct the display to display an address, a processor may execute computer instructions from a memory that sends messages to the display driver to cause the address to be displayed. In embodiments, the shippable storage device 100 may include a wireless interface configured to receive (e.g., via cellular or Wi-Fi network) instructions from a service provider.

In some embodiments, persistent storage 312 may include any combination of non-volatile storage such as hard drives or flash memory suitable for storing the client data 102. The persistent storage 312 may be configured (e.g., during a provisioning process) to store large amounts of processed data or encrypted data (e.g., from a large data store such as a customer storage system) during shipment from the customer location to a service provider location where the data is transferred to a service provider storage system.

In some instances, the shippable storage device 100 may include a power source that may powers at least some of the various electronic components of the shippable storage shippable storage device 100, which may include sensor(s) and sensor interface(s). Thus, any of various sensor(s) may be incorporated into shippable storage device 100. The sensor interfaces may perform various functions such as conversions of data, analysis of sensor output and output of information based on the analysis or the like.

In embodiments, the TPM 310 may provide additional security features for the shippable storage device 100. For example, after the remote storage provider 108 receives a device from a customer, the remote storage service 110 may communicate with the TPM 310 to determine whether a change has been made to the configuration of the shippable storage shippable storage device 100. Changes to the shippable storage shippable storage device 100 configuration may indicate that the shippable storage shippable storage device 100 was tampered with and that a third party may have accessed data on the shippable storage shippable storage device 100. In some embodiments, the client may perform the above verification processes when receiving a device from the remote storage provider 108.

Figure 4:
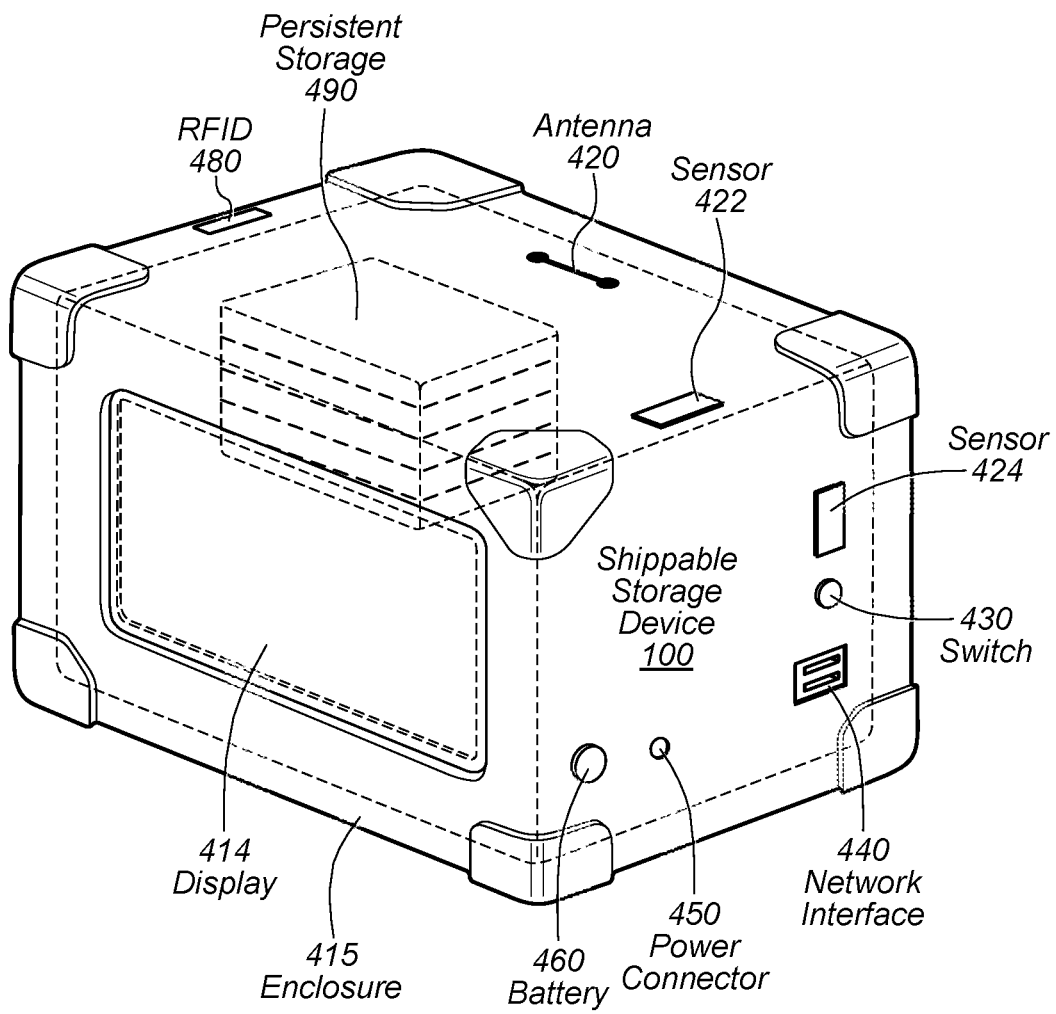
FIG. 4 illustrates a shippable storage device, according to some embodiments.

FIG. 4 illustrates a shippable storage device, according to some embodiments. The depicted shippable storage device 100 may be used to move large amounts of customer data off of customer storage networks or servers to other storage networks or servers, when other forms of transfer (e.g., broadband data transmission) are unavailable or cost or time prohibitive, for example. As discussed above, several of the depicted shippable storage devices 100 may be used for a bulk data transfer, local storage, and remote synchronization to a remote storage service 110. Embodiments of the shippable storage device 100 may include more, less, or different features or components than those depicted, in embodiments.

In the depicted embodiment, shippable storage device 100 includes an enclosure 415 surrounding persistent storage 490. The persistent storage may include any type of storage such as, but not limited to hard disk drives, optical media, magnetic tapes, memristor storage, persistent RAM or solid state storage devices. The enclosure may be ruggedized (e.g., according to various standards, such as military standards or electronics industry standards) and may be configured with an outward-facing electronic display 414 such that when enclosed by the enclosure, the persistent storage, the enclosure, and the electronic display form a self-contained shipping container suitable for shipping without any additional packaging, labeling or the like and such that the electronic display 414 acts as to display a destination location (e.g., in lieu of a shipping label). In embodiments, the enclosure 415 and the display 414 act as reusable shipping components in lieu of cardboard boxes and shipping labels. The enclosure may include various mechanisms to facilitate movement of the shippable storage device 100, such as rollers, handles or the like.

The shippable storage device 100 is illustrated with battery 460 and power connection 450 for powering some or all of the components of the shippable storage device 100 that require power to function. The power connection 450 may be configured to connect the shippable storage device 100 to an external power source, in embodiments. The power connector may power the persistent storage, in some embodiments. Other sources of power are contemplated, such as kinetic energy sources that rely upon the motion during shipping to power the shippable storage device 100, solar energy sources, or the like. Any of various power sources may power the electronics (e.g., the display or the storage) of the shippable storage device 100.

The shippable storage device 100 is depicted with display 414. The display 414 may incorporate any of various display technologies, such as low-power electronic-ink (E-ink), organic light emitting diodes (OLED), active-matrix organic light-emitting diode (AMOLED), flexible displays or touch-sensitive displays as non-limiting examples. Low-power e-ink displays may provide the benefit of reduced power consumption for a shipping environment where small batteries (e.g., batteries that cost less to ship, are less expensive or take up less shipping space) are preferred. The shippable storage device 100 may be configured with multiple displays 414, in some embodiments. For example, some carriers or fulfillment centers label three sides of a shipping container such that the destination of the container can be scanned or read irrespective of the orientation of the container. Similarly, multiple displays can be incorporated into multiple sides of the enclosure 415 of the device. For example, the enclosure may be configured with 1-6 or more displays, in some embodiments. The various displays maybe configured such that the displays are computer readable (e.g., via scanner).

The shippable storage device 100 is illustrated with network interface 240. The network interface 440 may act as interface between the shippable storage device 100 and various networks, such as LANS, WANS or the like (e.g., via various protocols, such as iSCSI or Ethernet). In some embodiments, network connection 440 may act as an interface directly to another device (e.g., via SCSI). In some instances, the network interface 440 may include two or more different types of interfaces (e.g., RJ45, SFP, optical).

The shippable storage device 100 is illustrated with switch 430. The switch 430 may act as an on-off power switch or as a switch to activate the display, in some embodiments. Device 100 is also illustrated with antenna 420. The antenna may be configured to facilitate wireless communication between the service provider or customer and the device. For example, the wireless communication may be over various cellular networks, Wi-Fi, or the like (e.g., network 120). For instance, the service provider may send updated address information to the shippable storage device 100 via cellular networks while the shippable storage device 100 is en route to some location. The updated address information may be displayed via the display 414 such that the shippable storage device 100 is rerouted on the fly, for example. In other embodiments, the wireless communication channel may be used to send updated shipping information for display while the device is located at the customer site. In embodiments, cellular networks may be used to track the device.

The shippable storage device 100 is illustrated with radio frequency identification (RFID) 480. The RFID may assist with tracking the device, in some instances. For example, devices may be identified during the provisioning process via a respective RFID or devices may be identified upon receipt at the customer or upon return to the service provider by a respective RFID. The RFID may be used to track the shippable storage device 100 as the device is routed through a facility, such as through a service providers fulfillment facility (e.g., while routed on a conveyor system).

The shippable storage device 100 is illustrated with various sensors 422, 424. The device may be outfitted with any of various sensors including a global positioning sensor (GPS), a temperature sensor, a humidity sensor or an accelerometer, all as non-limiting examples. Data may be collected from the sensors and used in various manners, such as to record the environment of the device (e.g., hot, cold, moderate, moist) or record various events associated with the shippable storage device 100, such as a drop, quick movement, orientation or location of the shippable storage device 100. The sensor data may be stored locally, sent over the network 120 or displayed via display 414.

The shippable storage device 100 may be configured with multiple layers of security. For example, data stored on the device may be encrypted one or more times, with one or more keys. The keys may be determined, stored, controlled or held by various parties and applied at various steps of the illustrated processes. For example, some keys used to encrypt the data stored on the device may be stored separate from the device, while other keys used to encrypt the data on the device may be stored with the device. The encryption keys may be applied in multiple layers, in embodiments.

The shippable storage device 100 may be configured as one or more other types of network-based device or other electronic devices, such as transient local hardware for example. In an example, non-exhaustive list, device 100 may be configured as various combinations of cryptographic hardware and software (e.g., as a type 1 cryptographic device), as a storage gateway, as a web service, a firewall, a high-assurance guard, a server, virtual machine image, one or more dongles, a data warehousing solution or database service box, or the like.

Figure 5:
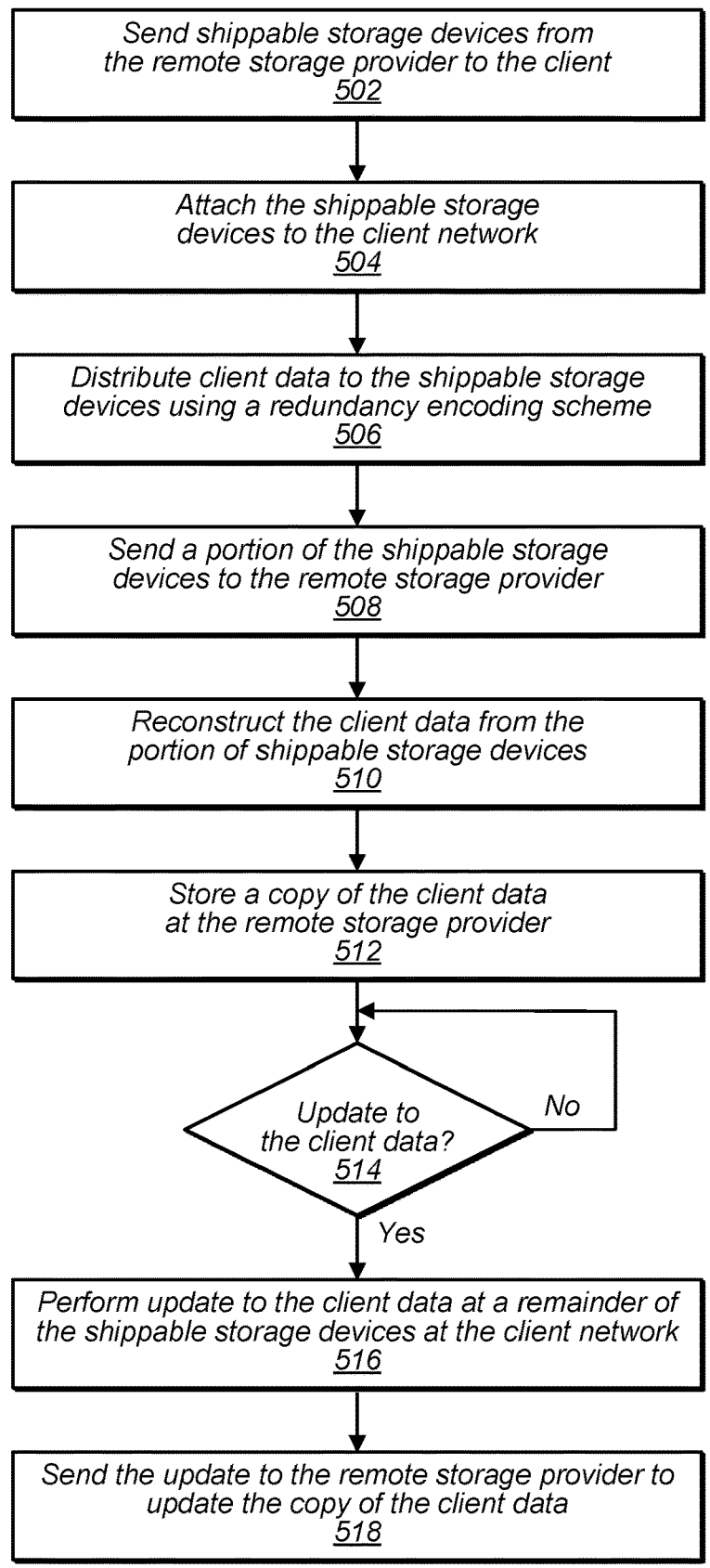
FIG. 5 is a flow diagram of a process for bulk data transfer, storage, and remote synchronization using shippable storage devices, according to some embodiments.

FIG. 5 is a flow diagram of a process for bulk data transfer, storage, and remote synchronization using shippable storage devices 100, according to some embodiments. Thus, one or more portions of the illustrated process may be performed via one or more components of one or more shippable storage devices 100.

At block 502, a remote storage provider 108 sends shippable storage devices 100 to a client. At block 504, the shippable storage devices 100 are attached to a client network 106 of the client. At block 506, at least one of the shippable storage devices 100 distributes client data 104 across the shippable storage devices 100 using a redundancy encoding scheme. At block 508, the client sends a portion of the shippable storage devices 100 to the remote storage provider 108. The portion may be a subset that includes one or more of the shippable storage devices. At block 510, the remote storage service 110 reconstructs the client data 116 from the portion of shippable storage devices 114. At block 512, the remote storage service 110 stores a copy of the client data 112.

At block 514, the at least one of the shippable storage devices 100 determines whether there is an update to the client data 102 (e.g., client modifies or updates the client data 102). If so, then at block 516, the at least one shippable storage device 100 performs the update to the client data 102 on the shippable storage devices 100 of the client network 106. At block 518, at least one shippable storage device 100 sends the update to the remote storage service 110 to update the copy of the client data 112.

Figure 6:
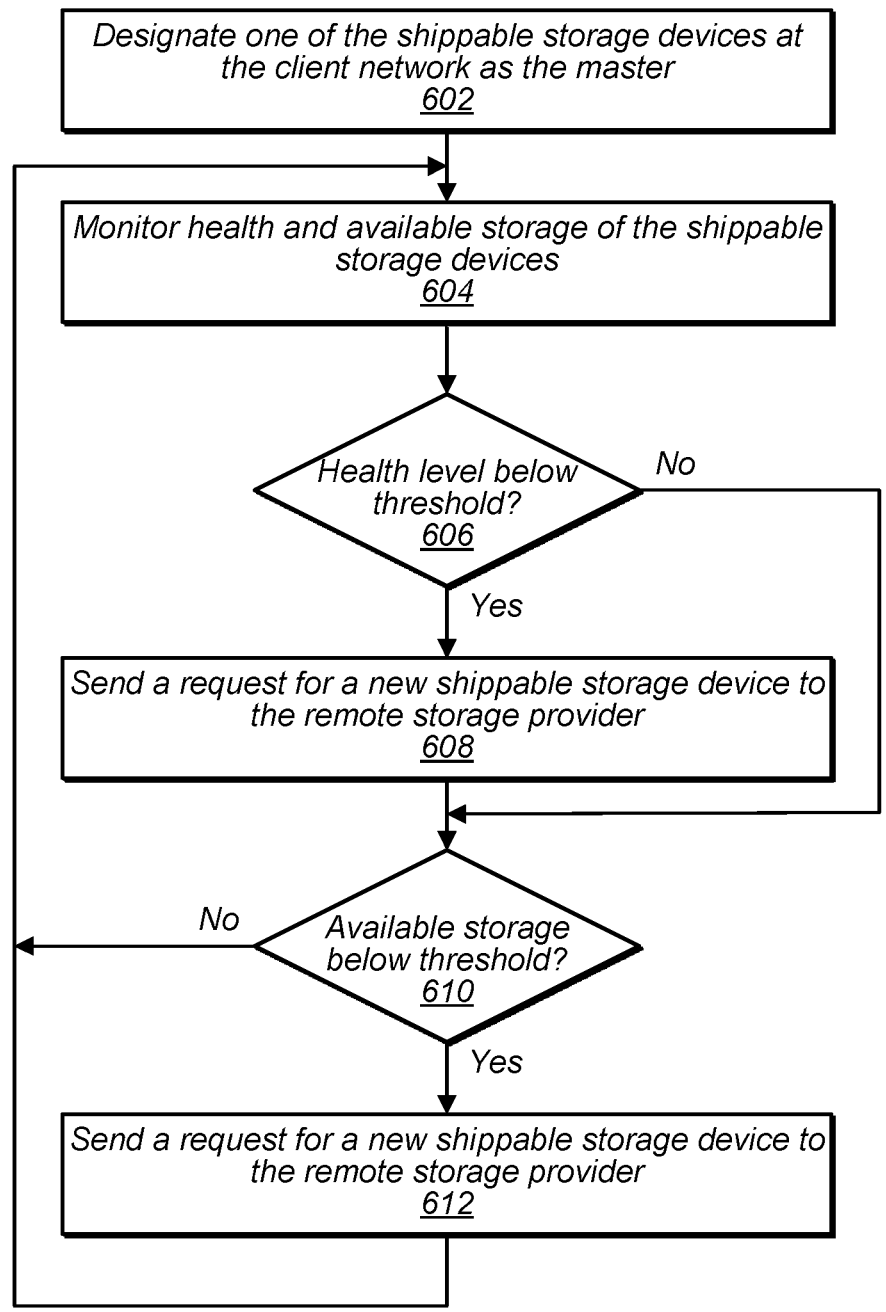
FIG. 6 is a flow diagram of a process for monitoring and replacing shippable storage devices, according to some embodiments.

FIG. 6 is a flow diagram of a process for monitoring and replacing shippable storage devices 100, according to some embodiments. Thus, one or more portions of the illustrated process may be performed via one or more components of one or more shippable storage devices 100.

At block 602, one of the shippable storage devices 100 is designated as a master device. At block 604, the master device monitors health and available storage of the shippable storage devices 100. At block 606, the master device determines whether the health level of one of the shippable storage devices 100 is below a pre-determined threshold level. If so, then at block 608, the master device sends an indication of the health level of the device and/or sends a request for a new device to the remote storage service 110.

The process then proceeds to block 610. If the health level of none of the shippable storage devices 100 is below a pre-determined threshold level, then at block 610, the master device determines whether the available storage of the shippable storage devices 100 is below a threshold level. If so, then at block 612, the master device sends a request for a new shippable storage device 100 to the remote storage service 110.

Figure 7:
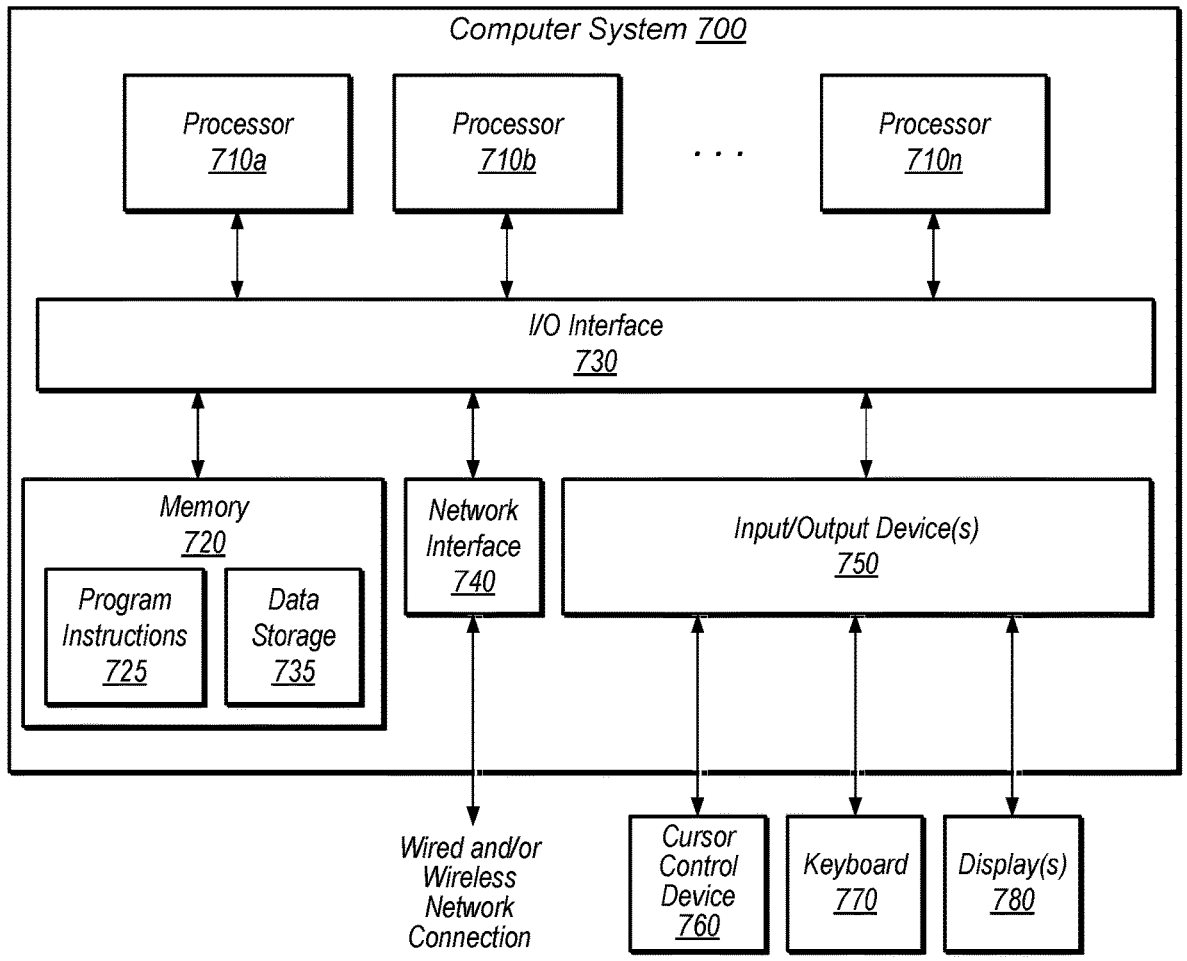
FIG. 7 is a block diagram illustrating an example computer system that implements some or all of the techniques described herein, according to some embodiments.

Any of various computer systems may be configured to implement processes associated with a shippable storage device 100. For example, FIG. 7 is a block diagram illustrating one embodiment of a computer system suitable for implementing some of the systems and methods described herein. In various embodiments, the remote storage service 70 and/or the client network 106 may each include one or more computer systems 700 such as that illustrated in FIG. 7. In embodiments, a shippable storage device 100 may include one or more computer systems 700 such as that illustrated in FIG. 7 or one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x106, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or service provider are shown stored within system memory 720 as program instructions 725. In some embodiments, system memory 720 may include data 735 which may be configured as described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other devices attached to a network, such as between the shippable storage device 100 and other computer systems, for example. In particular, network interface 740 may be configured to allow communication between computer system 700 and/or various I/O devices 750. I/O devices 750 may include scanning devices, display devices, input devices and/or other communication devices, as described herein. Network interface 740 may commonly support one or more wireless networking protocols (e.g., Wi-Fi/IEEE 802.7, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In some embodiments, I/O devices 750 may be relatively simple or "thin" client devices. For example, I/O devices 750 may be configured as dumb terminals with display, data entry and communications capabilities, but otherwise little computational functionality. However, in some embodiments, I/O devices 750 may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices 750 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 750 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device 750 (e.g., cursor control device, keyboard, or display(s) may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A method, comprising:
   distributing client data to a set of shippable storage devices attached to a client network, wherein the client data is encoded across the set of shippable storage devices as a plurality of different shards in accordance with a redundancy encoding scheme;
   shipping a subset of the set of shippable storage devices to a location of a remote storage provider for storing a copy of the client data at a remote storage service, wherein the subset of the shippable storage devices stores a sufficient amount of the encoded client data to reconstruct the client data according to the redundancy encoding scheme at the remote storage provider; and
   in response to receiving, from a client device of the client network by at least one of a remainder of the set of shippable storage devices attached to the same client network, an update for the client data, the at least one shippable storage device attached to the same client network performs both:
      applying, by the at least one shippable storage device attached to the same client network, the received update for the client data across different ones of the remainder of the set of shippable storage devices attached to the same client network in accordance with a redundancy encoding scheme, wherein a plurality of the remainder of the set of shippable storage devices attached to the same client network is sufficient to reconstruct the client data at the client network and a single one of the plurality of the remainder of the set of shippable storage devices attached to the same client network is insufficient to reconstruct the client data at the client network; and
      sending, from the at least one shippable storage device attached to the same client network to a remote network of the remote storage service via a network transmission, the received update for the client data to update the copy of the client data at the remote storage service.

2. The method of claim 1, wherein one of the remainder of the set of shippable storage devices is designated as a master device, and wherein:
   the performing of the update to the client data comprises:
      performing, by the master device, the update to the client data; and
   the sending of the update to the remote storage service comprises:
      sending, by the master device, the update to the remote storage service.

3. The method of claim 1, further comprising:
   determining, by at least one of the remainder of the set of shippable storage devices, that a health level of one or more of the remainder of the set of shippable storage devices is below a pre-determined threshold value; and
   in response to determining that the health level of the one or more of the remainder of the set of shippable storage devices is below the pre-determined threshold value, sending, from the at least one of the remainder of the set of shippable storage devices, a request for a new shippable storage device to the remote storage service.

4. The method of claim 1, further comprising:
   determining, by at least one of the remainder of the set of shippable storage devices, that an amount of available storage space of the remainder of the set of shippable storage devices is below a pre-determined threshold value; and
   in response to determining that the amount of available storage space of the remainder of the set of shippable storage devices is below the pre-determined threshold value, sending, from the at least one of the remainder of the set of shippable storage devices, a request for a new shippable storage device to the remote storage service.

5. The method of claim 1, wherein one of the set of shippable storage devices is designated as a master device, and wherein the distributing of the client data comprises:
   obtaining, by the master device, the client data from one or more locations on the client network; and
   distributing, by the master device, the client data to the set of shippable storage devices.

6. A system, comprising:
   a plurality of shippable storage devices configured to store client data, wherein the plurality of shippable storage devices are provided by a remote storage provider and are attached to a client network, and wherein individual ones of the shippable storage devices comprise:
      one or more processors; and
      a persistent storage configured to store at least a portion of the client data;
   wherein, in response to receiving from a client device of the client network by at least one of the shippable storage devices attached to the same client network, an update for the client data, the at least one shippable storage device attached to the same client network is configured to perform both:
      apply, by the at least one shippable storage device attached to the same client network, the received update for the client data across different ones of the plurality of shippable storage devices attached to the same client network in accordance with a redundancy encoding scheme, wherein the plurality of shippable storage devices attached to the same client network is sufficient to reconstruct the client data at the client network and a single one of the plurality of shippable storage devices attached to the same client network is insufficient to reconstruct the client data at the client network; and send, from the at least one shippable storage device attached to the same client network to a remote network of the remote storage provider via a network transmission, the received update for the client data to update a copy of the client data at a remote storage service of the remote storage provider.

7. The system as recited in claim 6, wherein the at least one of the plurality of shippable storage devices is selected according to a peer protocol and is further configured to:

perform the update to the client data across at least two of the plurality of shippable storage devices in accordance with the redundancy encoding scheme.

8. The system as recited in claim 6, wherein the at least one of the plurality of shippable storage devices is further configured to:

obtain the client data from one or more locations on the client network;

encode the client data into a plurality of shards in accordance with a redundancy encoding scheme;

encrypt each of the plurality of shards using at least one encryption key; and distribute individual ones of the plurality of shards to different corresponding ones of the plurality of shippable storage devices, wherein the at least one encryption key is not persisted on any of the plurality of shippable storage devices.

9. The system as recited in claim 6, wherein the at least one of the plurality of shippable storage devices is further configured to:

provide to a client device of the client network an interface for storing data to the plurality of shippable storage devices, wherein the interface for storing data to the plurality of shippable storage devices is a same interface as provided by the remote storage service for storing data to the remote storage service.

10. The system as recited in claim 6, wherein the at least one of the plurality of shippable storage devices is further configured to:

determine that a health level of one or more of the plurality of shippable storage devices is below a pre-determined threshold value; and provide an indication to the remote storage provider that the health level of the one or more of the plurality of shippable storage devices is below a pre-determined threshold value.

11. The system as recited in claim 6, wherein the at least one of the plurality of shippable storage devices is further configured to:

determine that an amount of available storage space of the plurality of shippable storage devices is below a pre-determined threshold value; and provide an indication to the remote storage provider that the amount of available storage space of the plurality of shippable storage devices is below a pre-determined threshold value.

12. The system as recited in claim 6, wherein the at least one of the plurality of shippable storage devices is designated as a master device and is further configured to:

detect a new shippable storage device attached to the client network, wherein the new shippable storage device is physically transported from the remote storage provider; and prior to joining the new shippable storage device to a cluster comprising the plurality of shippable storage devices, authenticate the new shippable storage device.

13. The system as recited in claim 12, wherein the master device is further configured to:

cause at least a portion of the client data to be stored onto the new shippable storage device in accordance with a redundancy encoding scheme.

14. A method, comprising:

receiving at a location of a storage provider at least one shippable storage device from a client;

obtaining client data from the at least one shippable storage device by a storage service of the storage provider;

storing the client data at the storage service;

receiving, via a network transmission, an update for the client data at a network of the storage provider from at least one of a plurality of remote shippable storage devices attached to a remote client network of the client, wherein the received update for the client data is a same update as an update that is both:

sent, from the at least one remote shippable storage device attached to the remote client network, to the network of the storage provider via a network transmission; and applied, by the at least one remote shippable storage device attached to the same remote client network, across different ones of the plurality of remote shippable storage devices attached to the same remote client network in accordance with a redundancy encoding scheme in response to receiving, from a client device of the same remote client network by the at least one remote shippable storage device attached to the same remote client network, the update for the client data, wherein the plurality of shippable storage devices attached to the same remote client network is sufficient to reconstruct the client data at the remote client network and a single one of the plurality of shippable storage devices attached to the same remote client network is insufficient to reconstruct the client data at the remote client network, and wherein the plurality of remote shippable storage devices are previously provided to the client by the storage provider; and updating the client data at the storage service in response to receiving the update for the client data.

15. The method of claim 14, wherein the at least one shippable storage device received by the storage provider comprises a plurality of shippable storage devices storing the client data in accordance with a redundancy encoding scheme, the method further comprising:

reconstructing the client data according to the redundancy encoding scheme.

16. The method of claim 14, further comprising:

prior to receiving the request to update the client data:

provisioning, by the storage provider, at least one of the plurality of remote shippable storage devices with instructions for storing data across the plurality of remote shippable storage devices in accordance with a redundancy encoding scheme; and providing, to the client, the plurality of remote shippable storage devices.

17. The method of claim 14, further comprising:
in response to updating the client data at the storage service, providing to the at least one of a plurality of remote shippable storage devices attached to the client network an indication that the client data at the storage service is updated.

18. The method of claim 14, further comprising:
determining, by the storage provider, that a health level of one or more of the plurality of remote shippable storage devices is below a pre-determined threshold value; and
in response to determining that the health level is below the pre-determined threshold value, providing, by the storage provider, one or more new shippable storage devices to the client.

19. The method of claim 14, further comprising:
determining, by the storage provider, that an amount of available storage space of the plurality of remote shippable storage devices is below a pre-determined threshold value; and
in response to determining that the amount of available storage space is below the predetermined threshold value, providing, by the storage provider, one or more new shippable storage devices to the client.

20. The method of claim 14, further comprising:
receiving, from the client network, a request to increase a durability of the client data from a lower level of durability to a higher level of durability; and
in response to receiving the request, providing, by the storage provider, at least one new shippable storage device to the client.

* * * * *